United States Patent [19]
Hayashi et al.

[11] Patent Number: 5,421,624
[45] Date of Patent: Jun. 6, 1995

[54] FLANGE JOINT ASSEMBLY

[76] Inventors: Toshiomi Hayashi, 2-18-7 Omachi Nishi, Asaminami-Ku, Hiroshima-ken, Hiroshima-shi; Teruo Egami, 18-7 Misuzuen Oaza Itsukaichi-cho, Saeki-ku, Hiroshima-ken, Hiroshima-shi, both of Japan

[21] Appl. No.: 194,659

[22] Filed: Feb. 10, 1994

[30] Foreign Application Priority Data

Feb. 10, 1993 [JP] Japan .................................. 5-045863

[51] Int. Cl.⁶ ........................................... F16L 23/032
[52] U.S. Cl. ...................... 285/334.2; 285/363; 285/382.2; 285/397; 285/370; 285/424; 29/512
[58] Field of Search ...................... 285/363, 405, 334.2, 285/382.2, 382.1, 382, 397, 398, 370, 371, 424, 331; 29/512, 515, 516

[56] References Cited

U.S. PATENT DOCUMENTS

| | | |
|---|---|---|
| 2,011,433 | 8/1935 | Blagg et al. .................. 285/371 X |
| 2,464,506 | 3/1949 | Hirschfield ...................... 29/512 |
| 3,786,730 | 1/1974 | Linderholm .................. 29/512 X |
| 3,794,363 | 2/1974 | Schulz ............................. 285/363 |
| 4,212,099 | 7/1980 | Williams et al. .............. 29/512 X |
| 4,558,892 | 12/1985 | Daw et al. ...................... 285/363 X |
| 5,213,374 | 5/1993 | Keating ............................ 285/331 |

FOREIGN PATENT DOCUMENTS

| | | | |
|---|---|---|---|
| 5039888 | 2/1993 | Japan ................................ 285/405 |
| 777493 | 6/1957 | United Kingdom ............... 285/398 |

*Primary Examiner*—Eric K. Nicholson
*Assistant Examiner*—Heather Chun Shackelford
*Attorney, Agent, or Firm*—Lyon & Lyon

[57] ABSTRACT

A flange joint assembly having first and second attachment flanges are associated with first and second tubes through an interengagement of the ends of the tubes between an inner annulus and an annular corrugation which are inwardly of an attachment plate. The annulus and corrugation with the interengaged tube end are flared outwardly to interlock the components. The tube also includes an outwardly tapered section adjacent to the end. A tubular insert having inwardly tapered outer surfaces extending to each end from a midsection is positioned within the tapered portions of two axially abutting tubes. Fasteners draw the attachment flanges together to complete the assembly.

5 Claims, 11 Drawing Sheets

FLANGE JOINT ASSEMBLY

BACKGROUND OF THE INVENTION

The field of the present invention is mechanisms for joining tubes end to end.

A flange joint assembly previously known is illustrated in FIGS. 1 and 2. A first tube 70 having an end segment 71 is fitted with a steel flange 72 having a central hole 73 so as to fit over the tube 70. The flange 72 is welded to the tube 70 at 74. A second tube 75 is also fitted with a steel flange 76 having a central hole 77 to accommodate the tube 75. The flange 76 is then welded at the tip 78 of the tube 75 and on the other side thereof at 80. A gasket 81 is then positioned against one or the other of the flanges 72 and 76 and the end 71 of the tube 70 is inserted into the end 79 of the tube 75. The outer diameter $D_7$ of the tube 70 is to provide a clearance fit with the inner diameter $D_8$ of the tube 75. Fasteners associated with the flanges 72 and 76 then draw the joint together, compressing the gasket 81.

FIGS. 3 and 4 illustrate a second previously known flange joint assembly. The tube 82 having an end portion 83 is associated with a stamped sheet metal flange 84 by inserting the tube 82 in the hole 85 of the flange 84 and welding the two together at 86. A second tube 87 is associated with a second such flange 88 having a central hole 89 to accommodate the tube 87. The flange 88 is welded on both sides at 90 and 91 to the tip 92 of the tube 87. A gasket 81 is again placed in position and the end portion 83 of the tube 82 is positioned in the tube 87. A clearance between the outside diameter $D_7$ of the tube 82 and the inside diameter $D_8$ of the tube 87 assist in the positioning of the tubes. Again, fasteners may draw the flanges 84 and 88 together to complete the joint.

With high performance tubing, the foregoing structures and arrangement are satisfactory. However, fabrication is difficult because of the welding required to complete the joint. Strain on the material during welding can lead to defects in the welded area. Welding itself is environmentally unfriendly and subject to defects. Gaskets can also be troublesome under various conditions. Further, such joints can lead to difficulty in disassembly and loose fit resulting from long-term usage.

SUMMARY OF THE INVENTION

The present invention is directed to a flange joint assembly. Deformation of an interior portion of an attachment flange with a tube end interengaged achieves an assembly of a tube with attachment flanges securely mounted in interlocking engagement. A tubular insert and portions of the tubing ends are conically formed to create a tight fit when assembled.

In a first and separate aspect of the present invention, an attachment flange having an annulus and an annular corrugation inwardly of an attachment plate are associated with a tube end. The tube is outwardly tapered approaching the tube end. A second such tube is similarly formed. Both tubes receive a tubular insert having tapered outer surfaces to mate with the outwardly tapered portions of the tubes.

In a second and separate aspect of the present invention, the flange joint assembly of the first aspect is drawn together by fasteners such that a fluid-tight fit is accomplished.

In a third and separate aspect of the present invention, the relative structures and materials of the tubes and tubular insert are arranged for specific response to stress. In one instance, the elasticity of the tubes is greater than that of the insert. In another, the coefficient of thermal expansion of the insert is greater than that of the tubes.

Accordingly, it is an object of the present invention to provide an improved flange joint assembly. Other and further objects and advantages will appear hereinafter.

DETAILED DESCRIPTION OF THE PREFERRED EMBODIMENT

Figure 1:
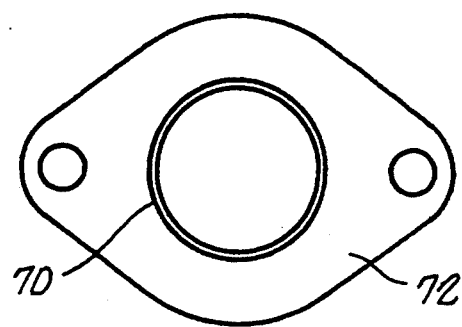
FIG. 1 is an end view of a prior art flange joint assembly.
Figure 2:
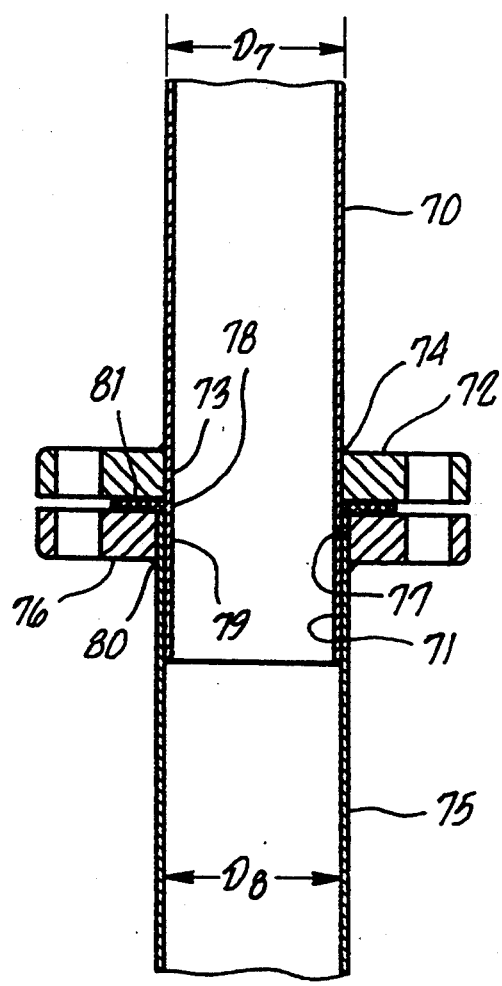
FIG. 2 is a cross-sectional side view of the flange joint assembly of FIG. 1.
Figure 3:
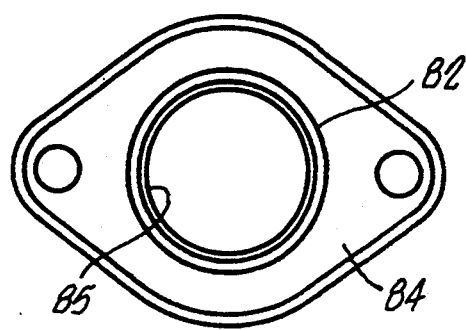
FIG. 3 is an end view of a second prior art flange joint assembly.
Figure 4:
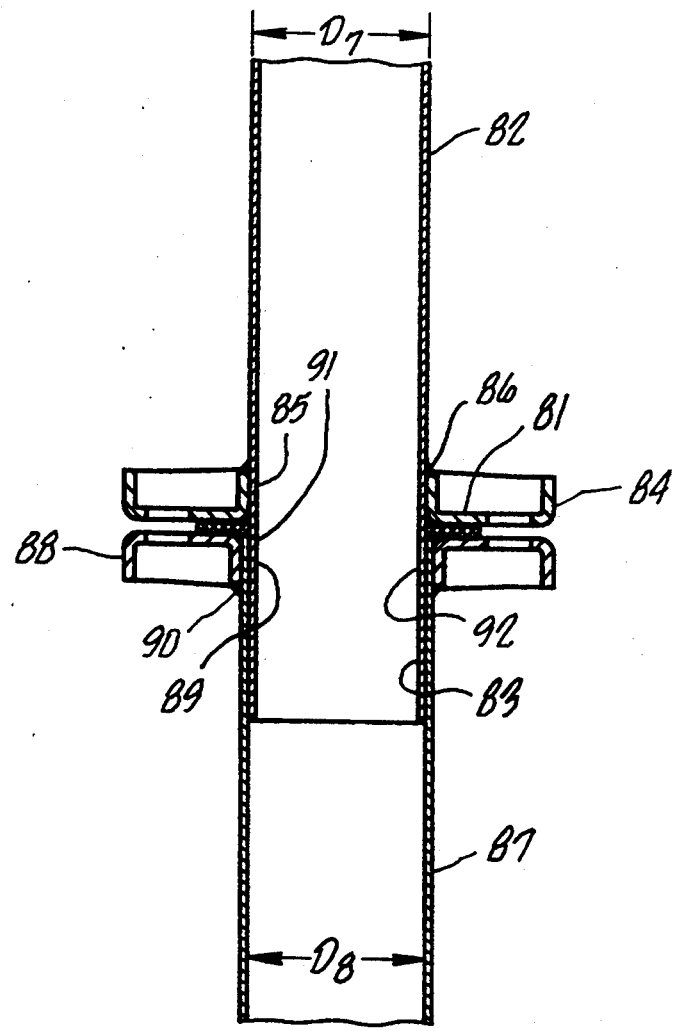
FIG. 4 is a cross-sectional side view of the flange joint assembly of FIG. 3.
Figure 5:
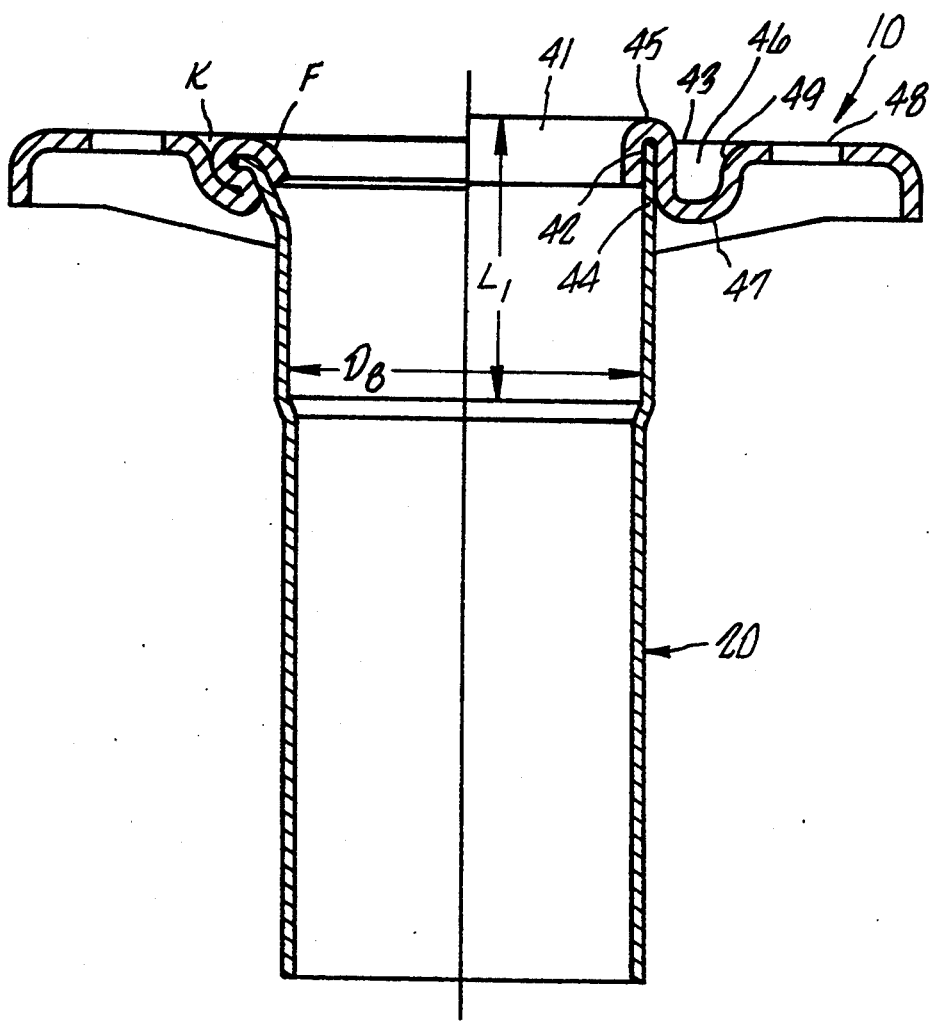
FIG. 5 is a cross-sectional view of one side of a first style flange joint assembly with the right side of the drawing showing an uncrimped assembly and the left side of the drawing showing the assembly after crimping.
Figure 6:
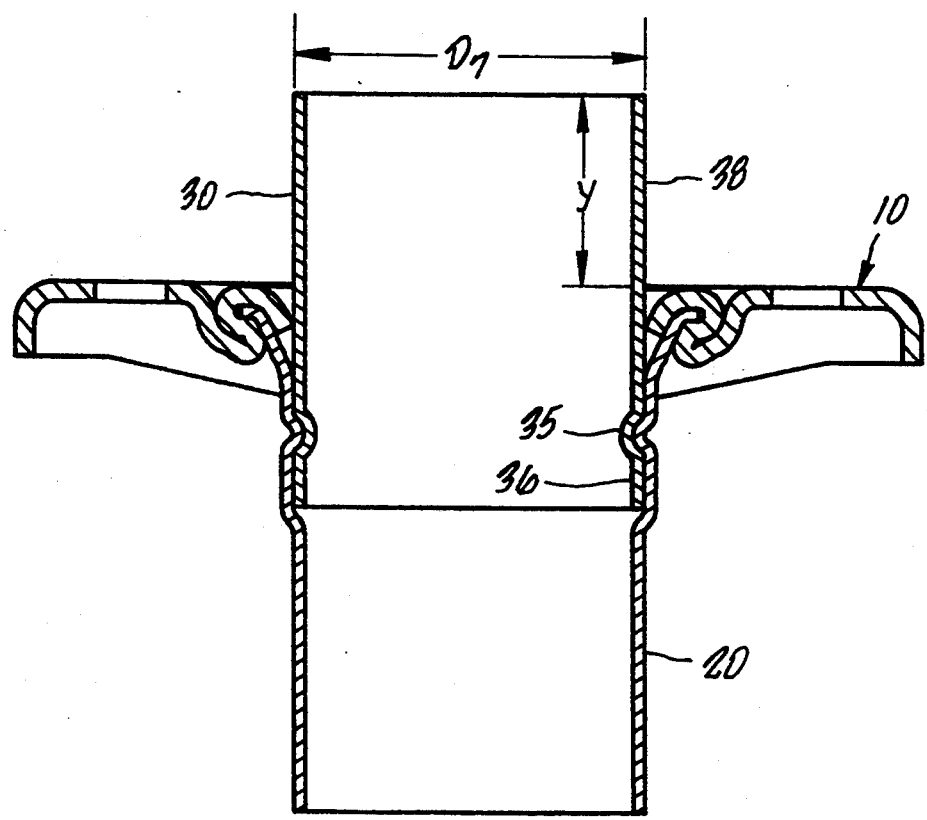
FIG. 6 is a cross-sectional view of the assembly of FIG. 5 with a tubular insert in place.
Figure 7:
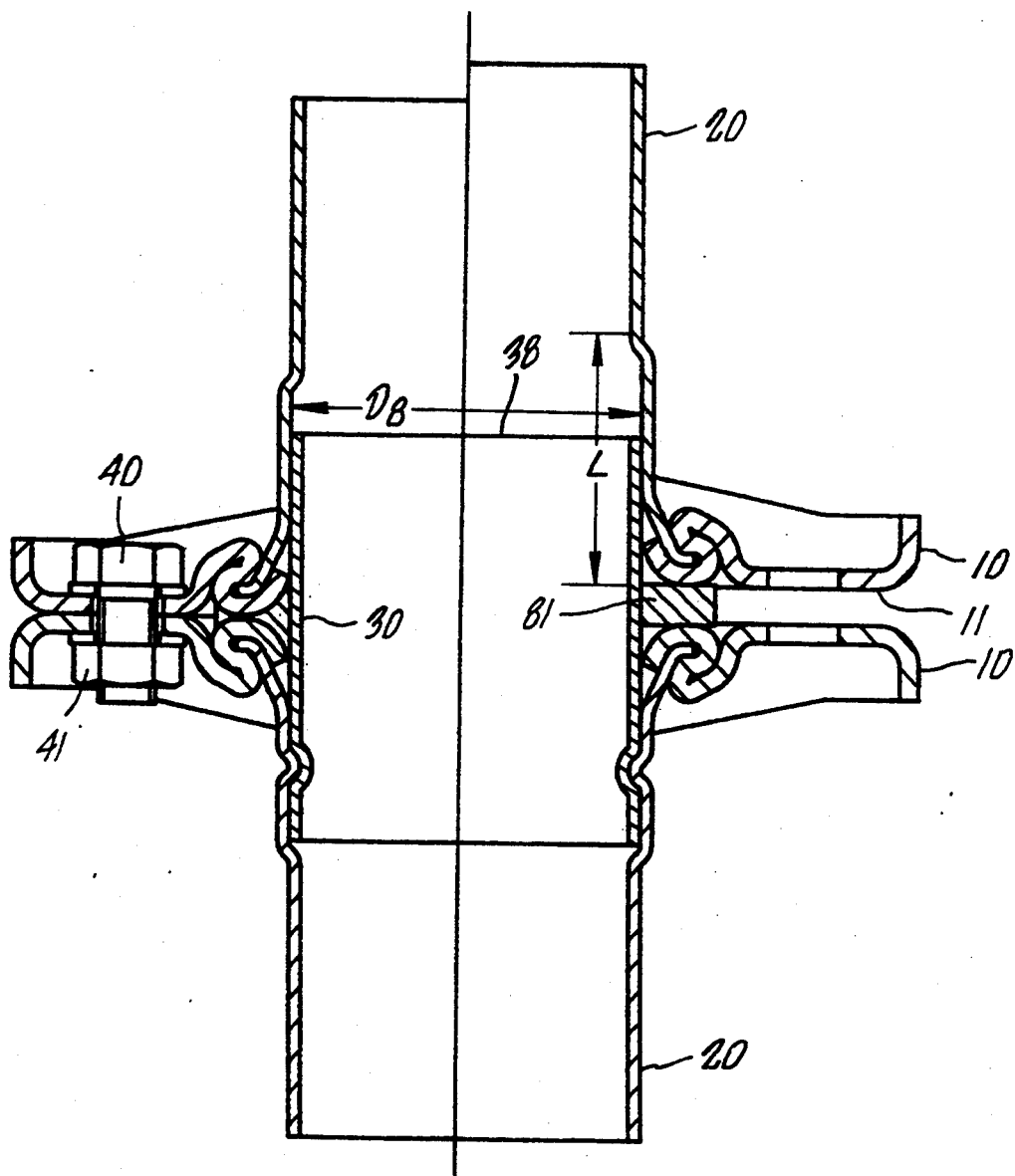
FIG. 7 is a cross-sectional view of a complete flange joint assembly using the device of FIG. 5 with the right side of the drawing showing an untightened assembly and the left side of the drawing showing a tightened assembly.

Turning in detail to the drawings and specifically FIGS. 5, 6 and 7, a first style flange joint assembly is illustrated having an attachment flange 10 of stamped metal construction. The attachment flange 10 includes an annulus 41 having an outer circular sidewall 42. Outwardly of the annulus 41 is a annular corrugation defined by an annular bend 45 in a first direction and an annular bend 47 in a second direction. The annular bend 45 is integral with the annulus 41 to form a narrow annular channel 44 defined by the sidewall 42 and a sidewall 43. The annular bend 47 defines an annular channel 46. The corrugation extends outwardly to an attachment plate 48 at the top of a sidewall 49, which sidewall 49 is part of the annular bend 47. The several elements are located concentrically on the attachment flange 10.

A tube 20 extends to the channel 44 defined by the sidewalls 42 and 43 where it is closely received. The tube 20 includes a main section of constant diameter and a section approaching the end of the tube of a constant, larger diameter $D_8$ extending for a preselected length, including the attachment flange 10, of $L_1$.

FIG. 5 illustrates the initial assembly position for the attachment flange 10 and the tube 20 on the right-hand side of the Figure. On the left-hand side of the Figure, these two elements are fully assembled. This is accomplished using a set of die and punch (not shown). The annulus 41 is flared outwardly to form the final annulus F. The annular channel 46 receives this material to become small cut mark K. The end of the tube 20 is deformed with the attachment flange 10 such that the tube 20 becomes interlocked with the attachment flange 10 and rigidly retained.

FIG. 6 illustrates a further step in the assembly process. A short tubular insert 30 is positioned within the completed assembly of the tube 20 and the attachment flange 10. The tube has an outside diameter $D_7$ providing for a clearance fit with the inside diameter $D_8$ of the end portion of the tube 20. The flaring of the end of the tube and of the annulus 41 is such that it provides clearance for placement of the tubular insert 30. The positioning of the tubular insert 30 is such that the base portion 36 is inserted into the tube 20 with the tip segment 38 extending outwardly of the attachment flange 10 by a length Y. The tubular insert 30 is retained within the assembly of the tube 20 and the attachment flange 10 by means of dings 35 formed into both the tube 20 and the tubular insert 30 from the outside.

In FIG. 7, further assembly is accomplished with the right side thereof illustrating placement of a second assembly of a tube 20 and an attachment flange 10 arranged with the mating surfaces 11 of the attachment flanges 10 facing one another but not yet drawn together. This arranges the tubular insert 30 into the end portion of the second tube 20 having an inside diameter $D_8$. Also assembled between the attachment flanges 10 is a gasket 81. Once positioned, fasteners, in this case a bolt 40 and a nut 41, are applied to draw the surfaces 11 of the attachment flanges 10 together. As can be seen in FIG. 7, the gasket 81 is compressed at the pinch to provide a fluid-tight seal.

Figure 8:
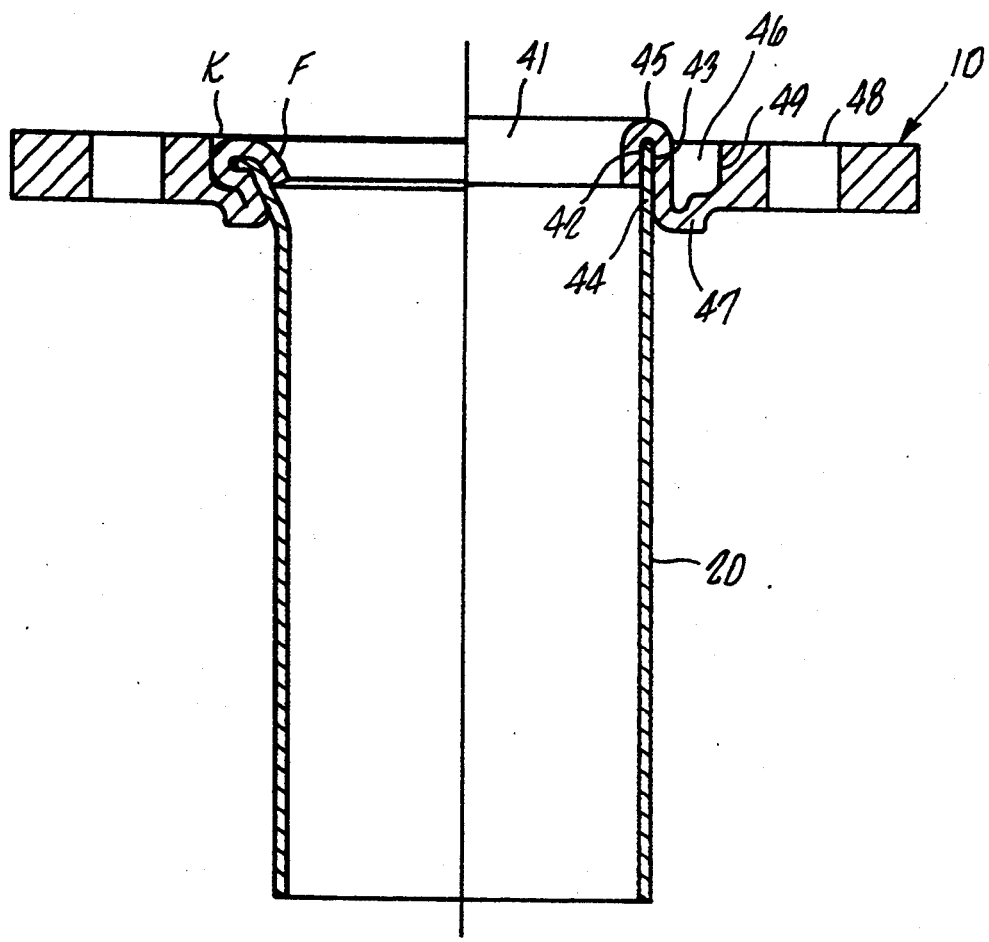
FIG. 8 is a cross-sectional view of the portion of the flange joint assembly of FIG. 5 with a different attachment plate, again with the right side illustrating an uncrimped assembly and the left side showing a completed crimped assembly.

An alternative attachment flange 10 is illustrated in FIG. 8. In this instance, the attachment flange 10 employs a thick plate. The annulus 41 and the corrugation remain thin walled such that they may be flared as before. This first style of flange joint assembly as seen in FIGS. 5 through 8 continues to require a gasket 81 which has pressure limitations and, depending on the working environment, can require periodic replacement.

Figure 9:
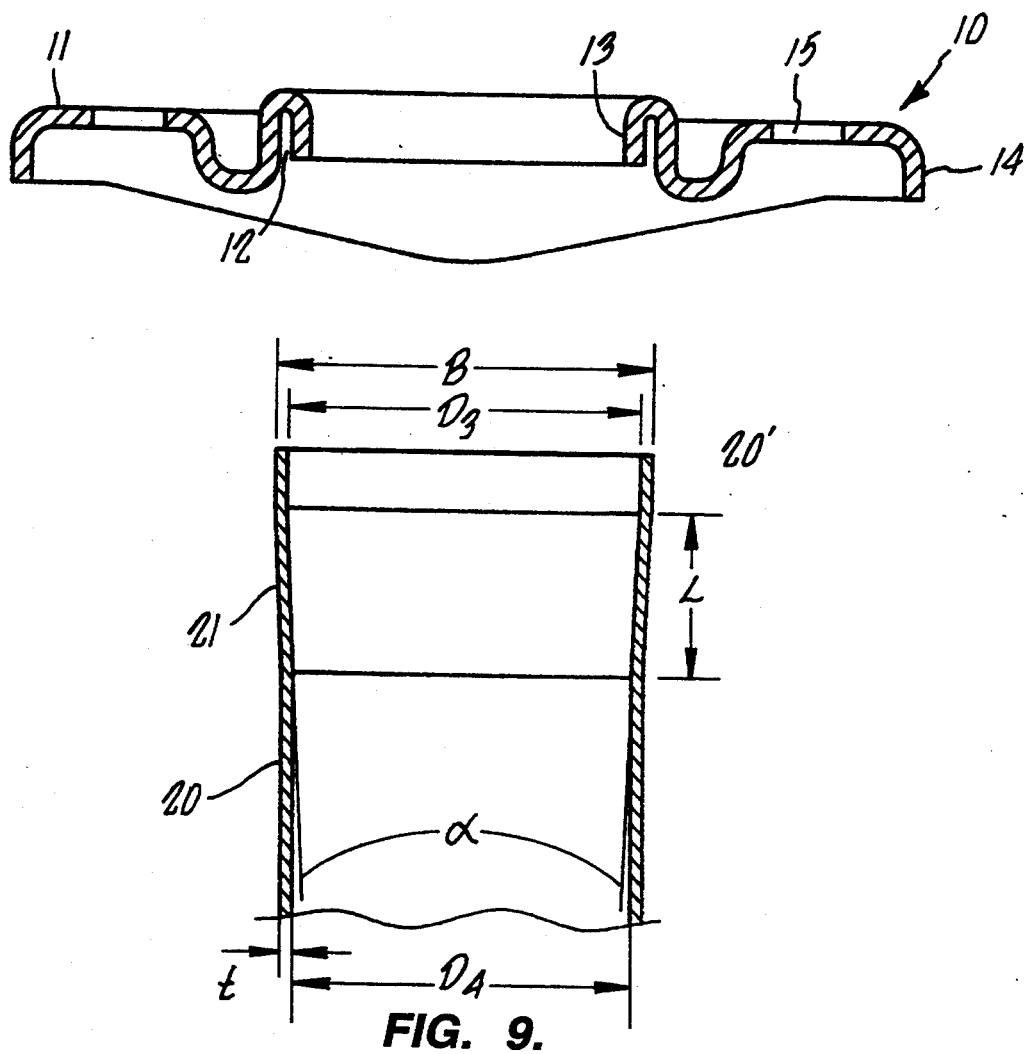
FIG. 9 is a cross-sectional view of a second style flange joint assembly illustrating an attachment flange and a tube yet to be assembled.

A second style is illustrated in FIGS. 9 through 14. These Figures illustrate a progressive assembly of the various components in this, the preferred embodiment. Reference numbers previously applied to the first style are applied here to similar but not necessarily identical elements. In FIG. 9, one attachment flange 10 is shown positioned for association with a tube 20. The attachment flange 10 is of the same character as in the first style. The flange 10 includes a mating surface defined by an attachment plate 11. A channel 12 is defined between the annulus 13 and a corrugation. A strengthening flange 14 is provided about the periphery of the attachment flange 10; and attachment holes 15 are strategically arranged as well.

The tube 20 extends through its main body having a wall thickness t and an inside diameter $D_4$. The tube end 20' has an increased inside diameter $D_3$ with an overall outside diameter B. Through length L, a tapered portion 21 is arranged such that there is an outward taper approaching the tube end 20'. In this length L, the tube 20 is expanded from an inner diameter $D_4$ to an inner diameter $D_3$. The dimensions B and $D_3$ are such that the tube end 20' may be snugly positioned within the annular channel 12 of the attachment flange 10. The tapered portion 21 provides a draft $\alpha$.

Figure 10:
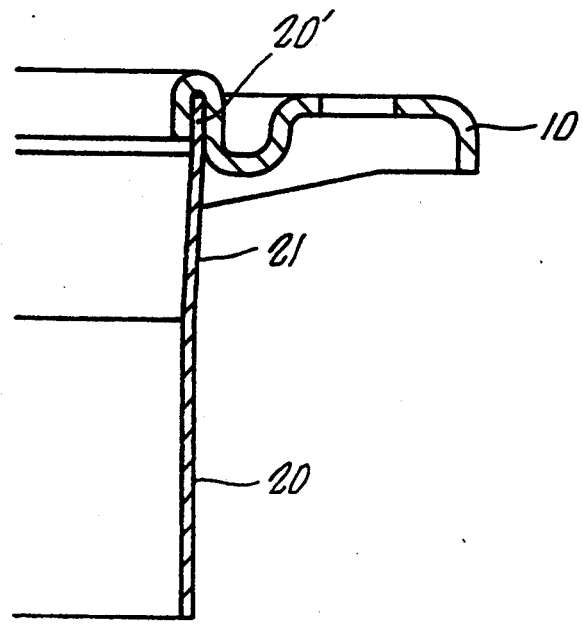
FIG. 10 is a cross-sectional view of the style of FIG. 9 with the attachment flange positioned but uncrimped on the tube.
Figure 11:
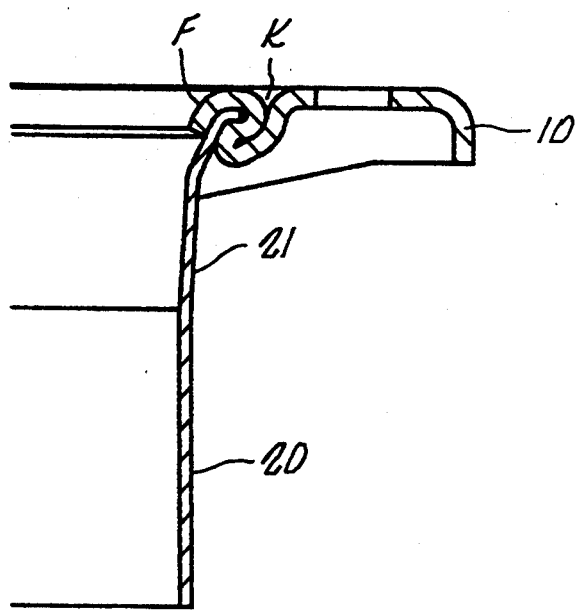
FIG. 11 is a cross-sectional view of the style of FIG. 9 with the attachment flange positioned and crimped on the tube.

Looking at FIGS. 10 and 11, the attachment flange 10 is shown positioned on the end 20' of the tube 20. Using the punch and die, the end 20' is interengaged in an interlocking engagement with the attachment flange 10 between the flanged annulus F and the annular corrugation now compressed to define a circular cut mark K. Thus, the tapered portion 21 is presented for receipt of a tubular insert.

Figure 12:
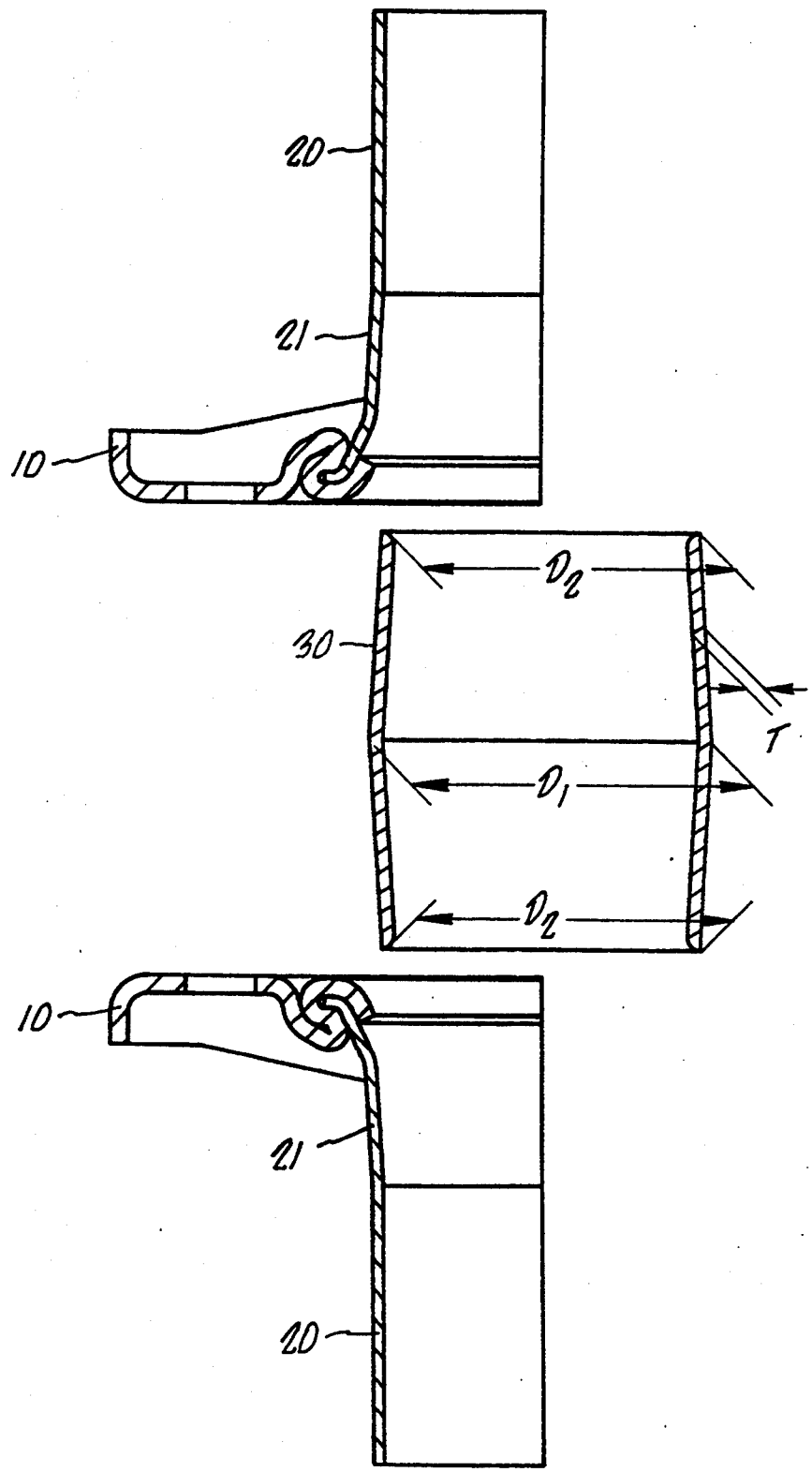
FIG. 12 is a cross-sectional view of the second style flange joint assembly shown in a disassembled state.
Figure 13:
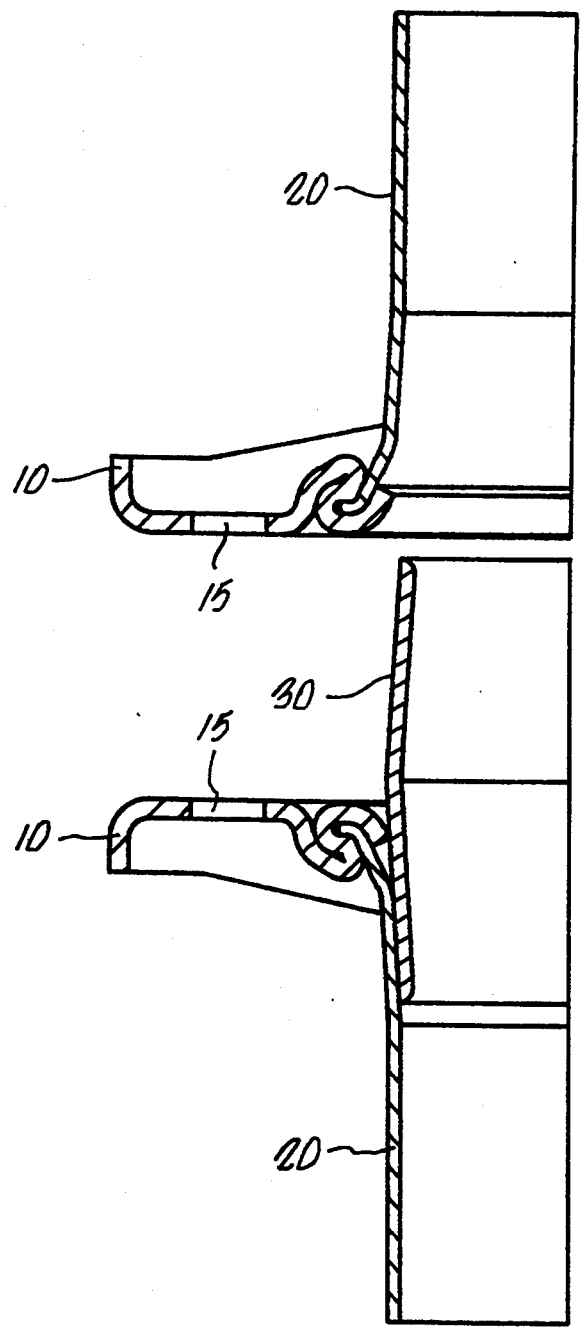
FIG. 13 is a cross-sectional view as in FIG. 12 with the flange joint assembly partially assembled.

The next step in the assembly is represented by FIGS. 12 and 13. A second assembly of an attachment flange 10 and a tube 20 are arranged with the attachment flanges facing. A tubular insert 30 is arranged to be inserted into each of the tapered portions 21. The tubular insert 30 has a wall thickness T with an outer surface which is tapered from the midsection at its maximum diameter $D_1$ to either end at minimum diameter $D_2$. This provides an angle of taper $\alpha'$ which closely fits the tapered section 21 having an angle $\alpha$. The fit is such that the midsection extends outwardly of the attachment flange 10 as can be seen in FIG. 13. This will provide for a tightening down of the elements to create a fluid-tight fit. The wall thickness T and material of the tubular insert 30 may be such that it provides greater strength and thermal expansion than the surrounding tapered portion 21 of each of the tubes 20. Thus, with the tapered portions 21 more elastic and having less expansion in response to heat, a fluid-tight seal can be assured under conditions of stress and thermal impact. Where cryogenics are contemplated, the coefficients may be adjusted accordingly.

Figure 14:
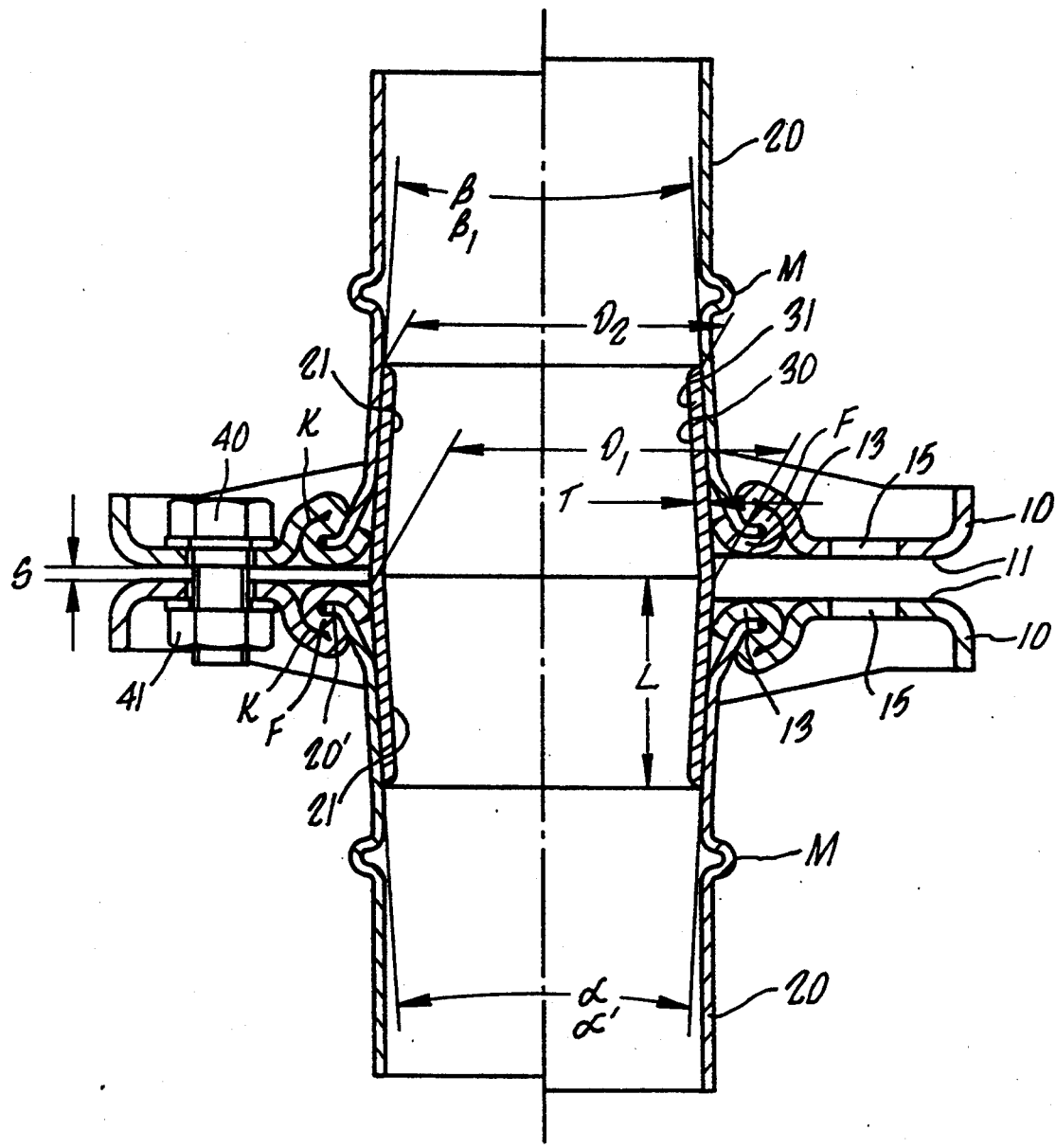
FIG. 14 is a cross section of an assembled second style flange joint assembly with the right side shown assembled but not tightened and the left side shown assembled and tightened.

As illustrated in FIG. 14, the final assembly includes placement of both the assemblies of attachment flanges 10 and tubes 20 facing one another with the tubular insert 30 positioned therein. The second assembly may include a different draft angle $\beta$ with a corresponding angle $\beta'$ on the tubular insert. However, most conveniently, the tapers $\alpha$ and $\beta$ are substantially identical. Prior to placing stress on the assembly, as seen on the right side of FIG. 14, a gap between surfaces 11 is presented with the tubular insert 30 positioned against the tapered portions 21 of the tubes 20. This allows for a tightening between these components as the flange plates are drawn together. Bolts 40 and nuts 41 then may draw the assembly together such that a space S remains with the bolts 40 in tension. If flexibility near the joint is appropriate, a corrugated section M of one or more corrugations may be provided as bending and extension stress relief.

Thus, as depicted in FIGS. 9 through 14, attachment flanges 10 are first positioned on the ends of tubular members having outwardly tapered sections near the ends. The inner corrugated section is crimped to interengage in an interlocking manner the end of the tubes 20 between the annuluses F and the corrugations. The tubular insert 30 may then be positioned in the tubes as arranged with opposed flanges. Fasteners then can be used to draw the components into a fluid-tight fit to form an appropriate flange joint assembly.

To provide an example of fabrication, reference is again made to FIGS. 9 through 14. The attachment flanges are shown to be of stamped sheet metal accomplished by executing a multiple number of stamping processes in sequence using a progressive stamping press. The tube 20 is of JIS G 3444, standard structural carbon steel tube, STK290 (electric resistance welding steel tube) with a wall thickness of T=2.3 mm and an O.D. of 48.6 mm. The tube end 20' is fitted into the annular channel 12. The annulus 13 is then flared to crimp both the end 20' of the tube 20 and the inner portion of the attachment flange 10 including the annulus 13 and the corrugated area. In this case, the length of the outwardly open tapered portion 21 of the tube 20 has an axial length L= 19 mm. The maximum I.D. of the tube at the tapered portion 21 is DB=46.2 mm. Thus, the draft angle $\alpha$ is 0.12 radian.

The tubular insert 30 in this example has a maximum O.D. of $D_1$=48.6 mm. The minimum O.D. at each end of the tubular insert 30 is $D_2$=45.0 mm. The length L of each tapered portion of the tubular insert 30 is L=30 mm. Thus, the draft angle $\alpha$ equals 0.12 radian. In addition, the assembly is formed such that $D_4 < D_2 < D_3 < D_1$. In this example, the truncated insert 30 and the ends of the tubes 20 are fabricated through a stamping process of standard structural carbon steel tube, STK 30 with O.D. of 48.66 mm and a wall thickness of T=2.3 mm. The dimension of the tubular insert 30 having a thickness T would be slightly larger than the end portions of the tubes 20 having a thickness of t. Using the same material suggests that the elasticity of the ends of the tubes 20 is somewhat greater than that of the tubular insert 30 such that the coefficients of thermal expansion are the same.

A second example employs a ferrite stainless steel tube, YUS430D (cold finished seamless steel tube) manufactured by New Japan Steel K.K. The tubes 20 have an O.D. of 42.7 mm with a wall thickness of t=1.5 mm. The tubular insert 30 is of high strength, high corrosion resistant two-phase stainless steel tube, YUS-DX1. The tubular insert was made similarly to the tubular insert 30 of example 1. Further, a corrugated section M, fabricated by a beading process at a location away from the tapered portion 21 of the tubes 20, provides for both bending and axial resilience to accommodate high temperatures and vibrations.

In the tube 20, the length of the tapered portion 21 is L =40 mm. The maximum I.D. of the tapered portion 21 is $D_3$=45.6 mm. The minimum I.D. is $D_4$=39.7 mm. Thus, the tapered portion 21 has a draft of $\alpha$=0.1475 radian. The wall thickness of the tubular insert 30 is T=2.0 mm which is greater than the wall thickness of the tubes of t=1.5 mm. The mechanical properties of the high strength, high corrosion resistant two-phase stainless steel tube YUS-DX1 are superior to that of the ferrite stainless steel tube YUS430D. Thus, the stress at collapse of the tubular insert 30 is higher than the yield stresses on the tubes 20 resulting from internal pressure. In addition, the linear expansion coefficient of the tubular insert 30 between room temperature and 100° C. is greater than the linear expansion coefficient of the tubes 20. The performance of such devices at high temperatures and internal pressures under vibration testing has proven superior fluid-tight coupling.

The assembly of the foregoing joints using the tubular insert 30 provides for ease of assembly in such uses as automobile exhaust systems. The insert provides a guide for assembling the tubes 20 allowing easy alignment of the flanges 10 through axial rotation of the tubes 20. Easy bolting procedures are possible such that the difficulties associated with welding and the like in cramped spaces is avoided. The assembly procedure is easy and does not require skilled labor. Gaskets or other packing is avoided which may be left off or damaged in installation or later subject to failure due to vibration, heat and the like. Where installed too loosely or where leaks develop, a simple tightening of the bolts to reduce the gap S provides easy resolution to a leakage problem.

As weight is becoming of increasing concern in vehicular equipment, the lack of seaming materials and welding allows for lighter, thin walled materials and for materials normally incompatible for welding. Even the fabrication of the tubes and attachment flanges is easily accomplished with low skill equipment. The capability for providing a fluid-tight weld as are other disadvantages of the welding process make conventional joints less desirable. The employment of the tubular insert 30 also gives added strength to the joint.

Accordingly, an improved flange joint seal and method of making such flange joint seals has been described. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A flange joint assembly comprising
first and second attachment flanges each having an attachment plate, an annulus inwardly of said attachment plate and an annular corrugation between said annulus and said attachment plate;
first and second tubes each having a tube end interengaged with a said attachment flange, respectively, between said annulus and said annular corrugation, each said annulus, each said corrugation and each said interengaged tube end being deformed outwardly toward said attachment plate to interlock said tube ends with said first and second attachment flanges, respectively, each of said first and second tubes being outwardly tapered approaching said tube ends, respectively;
a tubular insert having an outer surface tapered inwardly from the midsection to either end, said tubular insert closely fitting within each of said first and second tubes where each of said first and second tubes is outwardly tapered approaching each said tube end.

2. The flange joint assembly of claim 1, further comprising fasteners, said first and second tubes being axially aligned, said tubular insert being positioned in each of said first and second tubes where each of said first and second tubes is outwardly tapered approaching each said tube end, respectively, and said fasteners extending to each said attachment plate in tension to draw said tubular insert into said first and second tubes to create a fluid-tight fit.

3. The flange joint assembly of claim 1, said first and second tubes having greater elasticity in expansion where each of said first and second tubes is outwardly tapered approaching each said tube end than the elasticity in compression of said tubular insert.

4. The flange joint assembly of claim 1, said first and second tubes having a smaller coefficient of thermal expansion where each of said first and second tubes is outwardly tapered approaching each said tube end than said tubular insert.

5. The flange joint assembly of claim 1, at least one of said first and second tubes includes an elastic corrugated section displaced from where each of said first and second tubes is outwardly tapered approaching each said tube end, respectively.

* * * * *